Figure 1:
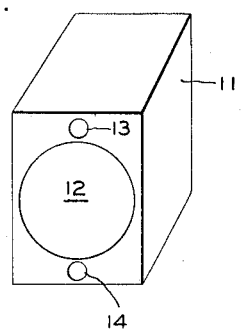

April 29, 1958     K. R. BROWN     2,832,904
ROTARY ELECTRIC GENERATORS

Filed Dec. 9, 1955     3 Sheets-Sheet 1

INVENTOR
Kenneth Robson Brown
BY Cameron, Kerkam & Sutton
ATTORNEYS

April 29, 1958 K. R. BROWN 2,832,904
ROTARY ELECTRIC GENERATORS
Filed Dec. 9, 1955 3 Sheets-Sheet 2
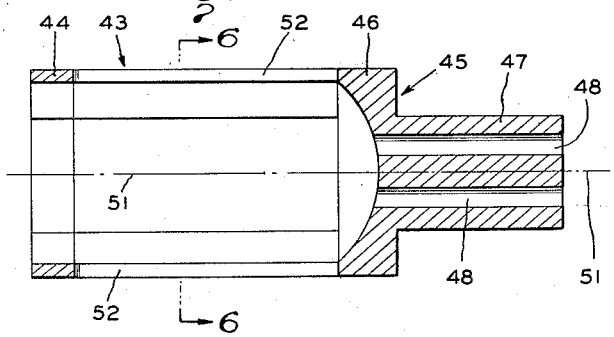
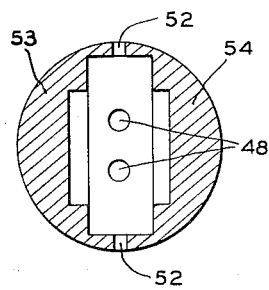
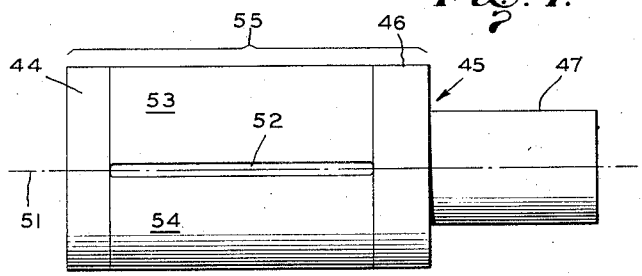
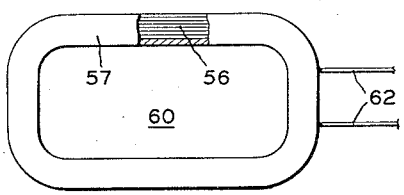
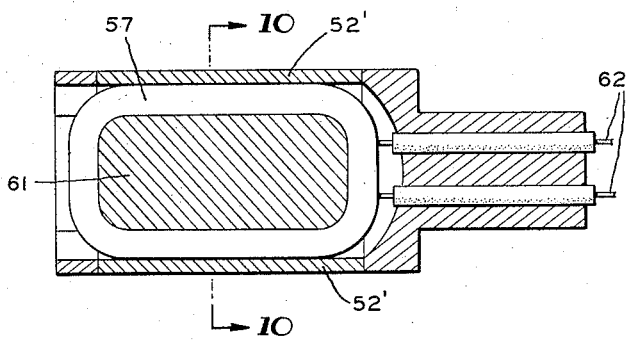
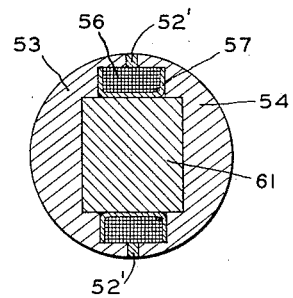
INVENTOR
Kenneth Robson Brown
BY Cameron, Kerkam & Sutton
ATTORNEYS April 29, 1958 K. R. BROWN 2,832,904
ROTARY ELECTRIC GENERATORS
Filed Dec. 9, 1955 3 Sheets-Sheet 3
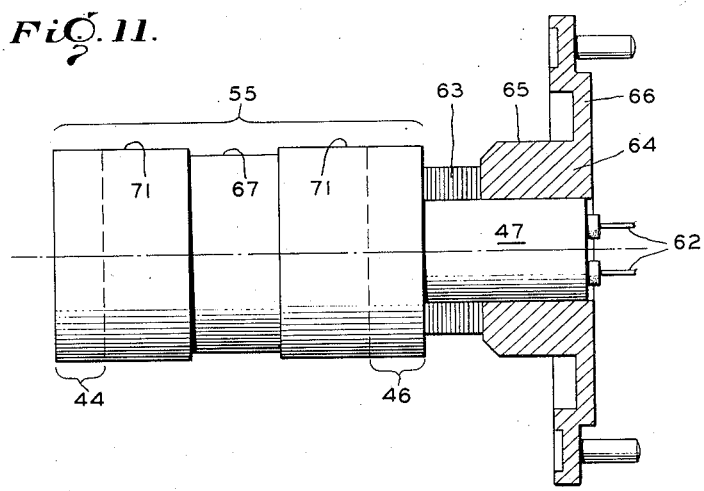
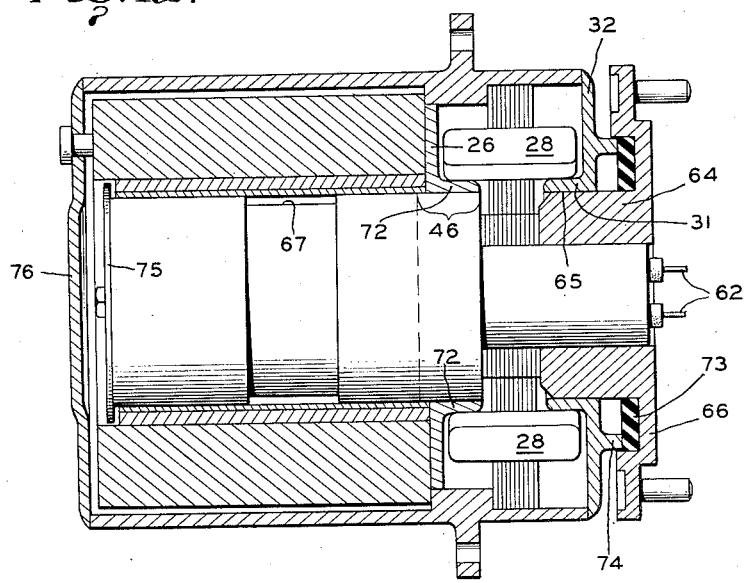
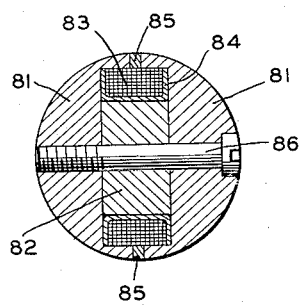
INVENTOR
Kenneth Robson Brown.
BY Cameron, Kerkam & Sutton
ATTORNEYS

United States Patent Office

2,832,904
Patented Apr. 29, 1958

2,832,904

ROTARY ELECTRIC GENERATORS

Kenneth R. Brown, Edinburgh, Scotland, assignor to Ferranti, Limited, Lancashire, England, a company of Great Britain and Northern Ireland Application December 9, 1955, Serial No. 552,181

Claims priority, application Great Britain December 11, 1954

7 Claims. (Cl. 310—42)

This invention relates to rotary electric generators of the type in which the generated voltage is derived from a winding of the rotor on rotation in the field set up by an external stator.

The invention has particular application to generators of the kind used in servo systems to generate a feedback voltage which is proportional to the angular velocity of a shaft, the term "velocity feedback" being usually applied to the generator.

Such a generator should fulfill exacting requirements. It should at any given rate of rotation produce as large a voltage as possible to avoid the need for subsequent amplification at high gain and at the same time allow the generator rotor to be coupled direct to the servo shaft without the need for intermediate gearing, which might introduce errors—e. g. due to backlash. The rotor winding must be electro-magnetically screened from any stray alternating magnetic fields, such as those emanating from nearby servo motors. Furthermore, side shake of the rotor must be reduced to a minimum, whilst any bowing of the centre of the rotor must be eliminated, for such motions result in the production of unwanted voltages.

It is also desirable in most cases that the rotor shaft should also carry the movable component of a pick-off designed to produce an output voltage accurately proportional to the angular position of the aforementioned servo shaft with respect to a datum position. Such a component must of course be very completely screened from the winding of the velocity-feedback part of the rotor.

Lastly, a generator should be of robust construction and of minimum size.

An object of the present invention is to provide a generator of the type stated which to a large extent fulfills the requirements above set forth.

In accordance with the present invention, there is provided a rotary electric generator of the type in which the generated voltage is derived from a winding of a bipolar rotor on rotation in the field set up by an external stator, wherein the rotor carries an uninterrupted circumferential bounding layer of non-magnetic conducting material for shielding the rotor winding from external alternating magnetic fields, at least a part of the surface of the layer being smoothly cylindrical to act as a journal for the rotational mounting of the rotor.

The rotor winding may have been preformed prior to assembly. The rotor core may have been formed separately from the rotor poles.

The pole faces of the stator may be shaped to provide at least one bearing for a said journal.

Figure 2:
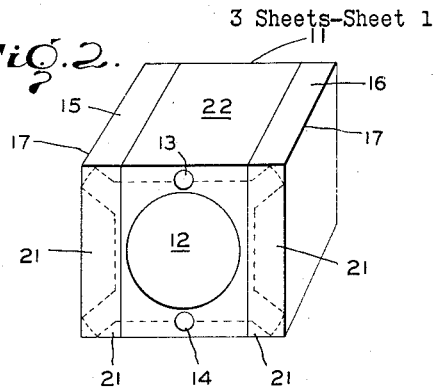
Figure 3:
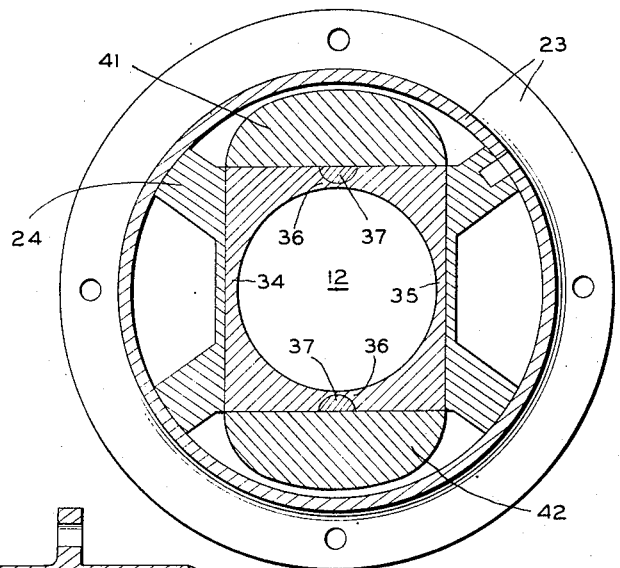
Figure 4:
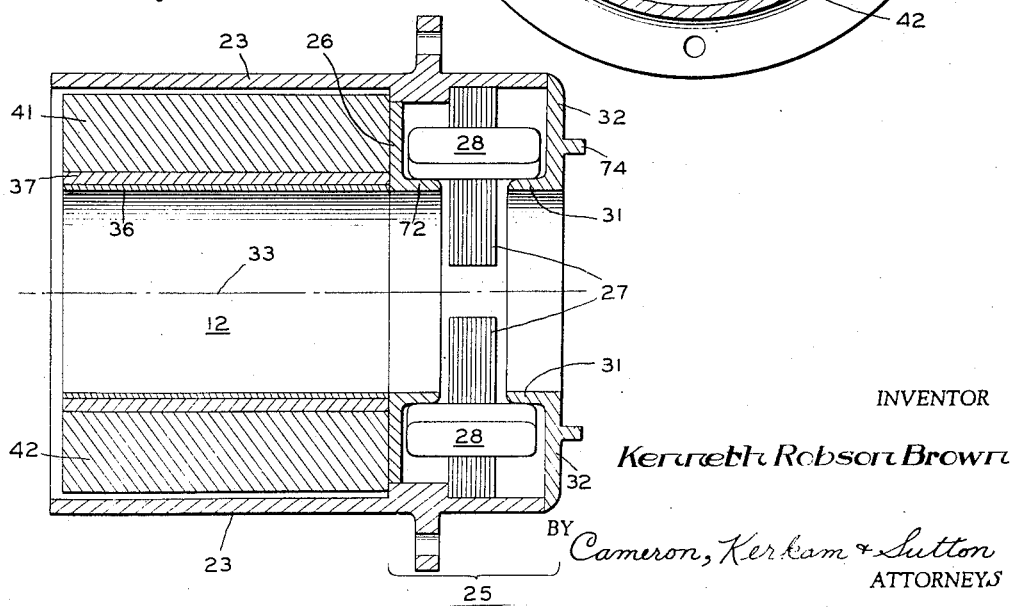

In the accompanying drawings,

Figures 1 and 2 are views in perspective of a part of a stator in the course of construction for a generator in accordance with the invention, Figure 3 is a cross sectional view, and Figure 4 a sectional elevation to a somewhat enlarged scale, of such a stator on completion, Figure 5 is a sectional elevation of a part of a rotor in accordance with the invention, Figure 6 is a cross section taken on the line 6—6 of Figure 5, Figure 7 is a plan view of the rotor part of Figures 5 and 6, Figure 8 shows in elevation, with a part broken away, a winding and its former for the rotor of Figures 5 to 7, Figure 9 is a sectional elevation and Figure 10 a cross section on the line 10, 10 of Figure 9 of the rotor during assembly, Figure 11 is a side view of the completed rotor, partly in section, Figure 12 shows the components of Figures 4 and 11 assembled, and Figure 13 is a cross section through a rotor in accordance with a further embodiment.

The invention will now be described by way of example as applied to a combined velocity feedback generator and position pick-off for a servo system.

In carrying out the invention according to this form, the feedback stator is a two-pole structure energised by permanent magnets, the pole faces being shaped to provide bearings for the rotor. The pole shoes are formed from a rectangular block of steel 11 (see Fig. 1) through which is bored, coaxially with one of the axes of the block, a shaft 12 which eventually forms a part of the stator tunnel (the end portions of which form the bearings above mentioned) but is to begin with of slightly less diameter. In parallel with this shaft, one on each side of it, are two further shafts 13 and 14 of equal but considerably less diameter. These shafts are equidistant from but close to shaft 12. The axes of all three shafts are parallel and lie in a midplane of the block, hereinafter referred to as the axial plane.

Within shafts 13 and 14 are cast copper rods; after this operation two equal rectangular brass blocks 15 and 16 (see Fig. 2) are brazed one to each of the sides of block 11 parallel to the axial plane.

The composite block is machined by turning about the axis of shaft 12 so that the brass edges 17 parallel to that axis are rounded off to become parts of a common cylindrical surface to allow the block to be fitted within a cylindrical casing that forms the outer structure of the stator. Intervening portions 21 of the brass are milled away to save weight. The face 22 of block 11 and the parallel face (not visible) are milled down to the planes of the axes of the respective copper rods 13 and 14.

The machined block is inserted in the stator casing 23, see Figs. 3 and 4, where it takes the form of a centrally disposed block of steel of approximately square cross section located by four approximately radial brass spiders 24. One end of the stator casing (the right hand end, as seen in Fig. 4) is extended to contain the pick-off part 25 of the stator, the two parts of the stator being separated by an intermediate screening disc 26. The pick-off part of the stator is of the conventional laminated four-pole construction, for A. C. energisation. The surfaces of these poles (two of which are indicated at 27 with the windings at 28) do not act as bearings, there being, on assembly, a short air-gap between these surfaces and the curved surface of the movable member of the pick-off, described below.

The bearing surface at this end of the stator is formed by the flanged portion 31 of an external disc 32 which closes this end of the stator and which is coaxial with the main axis 33 on the outer side of the pick-off part 25 of the stator. This bearing surface, in effect, continues that part of the stator tunnel drilled out of the steel block 11.

The composite stator tunnel (including the portion formed by the flange 31) is now ground to its final diameter. This process reduces to a very thin wall the steel between the tunnel and what remains of the copper rods 13 and 14. The pole shoes 34 and 35 (Fig. 3) of the feedback part of the stator are thus of the conventional semi-cylindrical form but with each of the customary circumferential air-gaps filled by an inner longitudinal strip of steel 36 and an outer longitudinal strip of copper 37. The steel strips 36, which are of course unitary with the pole shoes 34 and 35, are needed to give the tunnel a continuous circumferential surface to act as a bearing for the rotor; they shunt the magnetic flux to some extent but are easily saturated and leave a large useful flux to thread the rotor winding. The copper strips 37 strengthen the structure without shunting any more flux.

Permanent magnets 41 and 42 to provide the operating flux are located on the face 22 and the opposite face of the stator block and are accommodated in the cavities between these faces and the stator casing 23.

The stator cavities other than the tunnel and except for a space left open to act as a reservoir (not shown) for lubricating oil are filled with an insulating resin to prevent ingress of moisture and assist in securing the members against relative movement.

The construction of the rotor will now be described with reference to Figs. 5 to 7. A cylindrical centrepiece 43 (Fig. 5) of soft iron having an external diameter slightly less than the diameter of the stator tunnel and of length somewhat less than that of the feedback part of the stator is brazed in coaxial abutment with a cylindrical endpiece 44 of cadmium copper having the same external diameter but a shorter length. The combination is drilled axially and the resulting shaft is broached (shaped) to the form shown in Fig. 6, to contain the rotor core and winding. The other end of centrepiece 43 is silver-soldered in coaxial abutment with another endpiece 45, also of cadmium copper. Endpiece 45 is in the form of a cylindrical part 46 of the same diameter as centrepiece 43 (this being the part soldered to centrepiece 43) and a coaxial cylindrical part 47 of less diameter. Endpiece 45 is provided with two shafts 48 displaced one on each side of the rotor axis 51.

Two diametrically opposite slots 52 (shown in Figs. 6 and 7 but not in Fig. 5) parallel with rotor axis 51 are machined through the wall of centrepiece 43. Centrepiece 43 is thus divided into two parts 53 and 54 which are held in position by endpieces 44 and 45 and which constitute the respective poles of the bipolar rotor. Slots 52 thus constitute the airgaps between the pole tips; they are filled with brass inserts 52' (Figs. 9 and 10), brazed in position, to preserve uninterrupted the circumferential surface of the rotor.

The combined cylindrical surface 55 (Fig. 7) is silver plated to form a uniform cylindrical layer extending at its ends over endpiece 44 and over part 46 of endpiece 45. This layer is too thin to be depicted in the drawings.

The coil 56 (Fig. 8) is preformed of many turns of fine wire wound on a rectangular former 57. The rotor core, shaped as a rectangular block to fit the space 60 within the winding, is of magnetic material of high saturation flux density. It is formed separately from the rotor pole pieces 53 and 54. After this core has been inserted within the winding, these components are inserted within the rotor from the open end—that is, the left-hand end as seen in Fig. 5—so that the leads 62 from the winding pass through shafts 48 (where they are insulated by sleeves) from the inside outwards. The rotor is then as shown in Figs. 9 and 10, with the core indicated at 61. From Fig. 10 it will be seen that core and winding fill the enlarged space within centrepiece 43 completely, the core completing the magnetic circuit between the two poles. Except for the short brass-filled airgaps $52^1$, the winding is encircled by the rotor poles. Sealing material is then inserted to fill any spaces and secure core and winding in position. Owing to the limited extent of rotation of the rotor, slip-rings or the like to connect leads 62 to external apparatus are not required.

To the part 47 of endpiece 45 is keyed a stack 63 (Fig. 11) of laminations to form the rotor component of the pick-off. Also keyed to part 47, on the outer side of laminations 63, is a boss 64 having a cylindrical surface 65 of approximately the same diameter as plated surface 55. The outer end of this boss is extended radially outwards as a disc 66, by means of which the rotor is driven.

Cylindrical surfaces 55 and 65 are turned down to a smooth finish to fit within the composite stator tunnel to act as journals for the rotational mounting of the rotor. A central part 67 of the plated surface is turned down to a slightly less diameter to provide with the part of the stator tunnel in register with it a channel for oil to lubricate the journals, this part of the stator being in communication with the oil reservoir above mentioned. The stator is also provided with oil holes (not shown) communicating with the reservoir.

The rotor is now inserted in the stator tunnel, as shown in Fig. 12. The axial positions of the various components are of course such that the rotor poles 53 and 54 are in register with the corresponding stator poles 34 and 35 (Fig. 3). The bearing surfaces formed by these feedback stator poles engage the journals 71 (Fig. 11) formed by the plated surface of the rotor (where not turned down at 67 to provide the oil channel) but including only a portion of cylindrical surface 46 of endpiece 45. The rest of surface 46 is in register with a flanged inner part 72 (see also Fig. 4) of the intermediate screening disc 26. The bearing surface formed by flange 31 of external disc 32 engages the journal formed by surface 65 of boss 64.

An end stop in one direction is provided by the inner radial surface of a washer 73 of polytetrafluorethylene, carried by disc 66, in engagement with a ridge 74, carried by disc 32.

The end stop for the other direction is located at the other end of the generator where it takes the form of a disc 75 bolted to the rotor but of greater diameter, a peripheral part of this disc engaging a counterbored part of the stator tunnel. This end of the stator is closed in by a cover 76 to provide an oil seal.

The oil reservoir is filled with a silicone oil of high and stable viscosity.

As a result of the above construction, the rotor winding is surrounded by an uninterrupted circumferential bounding layer (the silver plating of surface 55) of conductive material which through eddy-current reaction shields the rotor winding from any external A. C. magnetic fields. As this layer is of non-magnetic material it does not by-pass any of the stator flux required to link the rotor winding. Shielding against any A. C. fields emanating from the pick-off is provided by plated surface 46 of endpiece 45 in conjunction with screening disc 26 and its flange 72 (Fig. 12). Very complete protection of the rotor winding from outside interference is thus attained.

Another important advantage is that as the rotor winding is preformed, is totally enclosed, and is carried by a former designed solely for that purpose, a much finer gauge of wire may be used than in the case where the wire is wound direct onto the rotor pole structure and must therefore be fairly robust. Many more turns of wire can therefore be accommodated, with the result that a considerably increased output voltage is provided.

The bearing system, formed in part by the cylindrical rotor surfaces, renders unnecessary the use of separate bearings, which would of course increase the bulk and weight of the generator. Moreover, the use of the large bearing surfaces allowed by this construction, together with an oil of high viscosity, reduces side-shake to a minimum and results in the practically complete absence of centre bowing of the rotor.

The fact that the rotor core is made separately from the poles allows this core to be made of a material having a high saturation flux density, thereby increasing the useful flux and so improving the signal-to-noise ratio of the generator, whilst allowing the rest of the magnetic circuit of the rotor—that is, the poles 53 and 54—of larger area to be made of soft iron; this reduces the cost of the rotor and simplifies the brazing and soldering of the centrepiece to the endpieces.

In an alternative method of construction, the rotor poles are made separately from one another and on assembly are bolted together with a preformed winding on a preformed core located between them, the airgap between the rotor pole tips being filled with non-magnetic material and the whole circumferential surface being plated as before to provide an uninterrupted bounding layer for shielding purposes. A rotor so constructed is illustrated in Fig. 13. The poles 81 have between them the core 82 surrounded by the winding 83 on its former 84, the pole tips being separated by brass insets 85 and the cores being secured together by a bolt 86.

It is not always necessary to turn down the centre part 67 of the rotor surface to provide an oil reservoir, since the journals may be lubricated from the ends when the axial length of the rotor is short enough.

In the arrangement first described, it is not essential to make the slots 52 deep enough to divide the centrepiece into two parts. A thin strip of iron, insufficient to shunt the flux appreciably, may be left between each pair of rotor pole tips.

What I claim is:

1. A rotary electric generator of the type in which the generated voltage is derived from a winding of a bipolar rotor on rotation in the field set up by an external stator, wherein the rotor comprises a rotor core of magnetic material formed separately from and common to both of the rotor poles, and a preformed rotor winding encircled by the rotor poles except for short airgaps between adjacent pole tips, said airgaps being filled with non-magnetic material, the rotor also carrying an uninterrupted circumferential bounding layer of non-magnetic conducting material for shielding the rotor winding from external alternating magnetic fields, at least a part of the surface of the layer being smoothly cylindrical to act as a journal for the rotational mounting of the rotor.

2. A rotary electric generator of the type in which the generated voltage is derived from a winding of a bipolar rotor on rotation in the field set up by an external stator, wherein the rotor carries an uninterrupted circumferential bounding layer of non-magnetic conducting material for shielding the rotor winding from external alternating magnetic fields, at least a part of the surface of said layer at each end of the rotor being smoothly cylindrical to act as a journal for the rotational mounting of the rotor, said surface being of reduced diameter in between said parts for the retention of oil to lubricate the journals.

3. A rotary electric generator of the type in which the generated voltage is derived from a winding of a bipolar rotor on rotation in the field set up by an external stator, wherein the rotor carries an uninterrupted circumferential bounding layer of non-magnetic conducting material for shielding the rotor winding from external alternating magnetic fields, at least a part of the surface of the layer being smoothly cylindrical to act as a journal for the rotational mounting of the rotor, and wherein the pole faces of the stator are shaped to provide at least one bearing for a said journal.

4. A method of manufacturing a bipolar rotor for an electric generator which includes the steps of securing a cylindrical centrepiece of magnetic material in coaxial abutment at each end with a cylindrical endpiece of like external diameter, forming through one endpiece into the centerpiece an axial aperture for the insertion of the rotor core and rotor winding into the centrepiece, forming in the cylindrical surface of the centrepiece two diametrically opposite longitudinal slots parallel to the cylindrical axis to divide the centrepiece into two rotor poles, inserting the core and winding into the centrepiece and securing them therein, forming on the cylindrical surface of the centrepiece an uninterrupted circumferential bounding layer of non-magnetic conducting material, and smoothing at least a part of the surface of said layer to act as a journal for the rotational mounting of the rotor.

5. A rotary electric generator comprising a stator, a bipolar rotor adapted to rotate in the field set up by said stator having a pair of poles forming the entire circumference of the rotor except for a pair of relatively short gaps between adjacent pole tips, a rotor core of magnetic material formed separately from said rotor poles, a voltage generating winding mounted on said core and substantially encircled by said rotor poles, and an uninterrupted circumferential bounding layer of non-magnetic conducting material on the external surface of said rotor for shielding the rotor winding from external alternating magnetic fields, at least a part of the surface of said layer being smoothly cylindrical and forming a journal for the rotational mounting of said rotor.

6. A generator as claimed in claim 5 wherein the gaps between adjacent pole tips are filled with non-magnetic material to provide the rotor with an external surface of uninterrupted cylindrical form.

7. A generator as claimed in claim 5 wherein the end portions of the rotor are of greater diameter than the central portion thereof and act as journals for said rotor, the central portion of reduced diameter forming a channel for oil to lubricate the journals.

References Cited in the file of this patent

UNITED STATES PATENTS

| 473,367 | Short | Apr. 19, 1892 |
| 507,297 | Wilkes | Oct. 24, 1893 |
| 2,632,123 | Kober | Mar. 17, 1953 |
| 2,673,302 | Gynt | Mar. 23, 1954 |

FOREIGN PATENTS

| 485,225 | Great Britain | May 17, 1938 |